(12) United States Patent
Lin et al.

(10) Patent No.: US 6,856,519 B2
(45) Date of Patent: Feb. 15, 2005

(54) INVERTER CONTROLLER

(75) Inventors: Yung-Lin Lin, Palo Alto, CA (US); Da Liu, San Jose, CA (US)

(73) Assignee: O2Micro International Limited, Grand Cayman (KY)

( * ) Notice: Subject to any disclaimer, the term of this patent is extended or adjusted under 35 U.S.C. 154(b) by 76 days.

(21) Appl. No.: 10/139,619

(22) Filed: May 6, 2002

(65) Prior Publication Data

US 2003/0206426 A1 Nov. 6, 2003

(51) Int. Cl.$^7$ ............................................. H02M 3/335
(52) U.S. Cl. .................. 363/16; 363/132; 315/307; 323/905
(58) Field of Search ................................ 345/204, 205, 345/208, 210, 211, 212; 315/306, 307; 363/25, 16, 17, 132; 713/1; 323/905

(56) References Cited

U.S. PATENT DOCUMENTS

| | | | |
|---|---|---|---|
| 4,277,728 A | 7/1981 | Stevens | 315/307 |
| 4,504,895 A | 3/1985 | Steigerwald | 363/17 |
| 4,535,399 A | 8/1985 | Szepesi | 363/20 |
| 4,541,041 A | 9/1985 | Park et al. | 363/41 |
| 4,672,528 A | 6/1987 | Park et al. | 363/98 |
| 4,727,469 A | 2/1988 | Kammiller | 363/56 |
| 4,752,700 A | 6/1988 | Boyacigiller | 307/297 |
| 4,794,506 A | 12/1988 | Hino et al. | 363/17 |
| 4,814,962 A | 3/1989 | Magalhaes et al. | 363/16 |
| 4,833,584 A | 5/1989 | Divan | 363/37 |
| 4,855,888 A | 8/1989 | Henze et al. | 363/132 |
| 4,860,189 A | 8/1989 | Hitchcock | 363/132 |
| 4,864,483 A | 9/1989 | Divan | 363/37 |
| 4,912,622 A | 3/1990 | Steigerwald et al. | 363/98 |
| 4,935,857 A | 6/1990 | Nguyen et al. | 363/17 |
| 4,952,849 A | 8/1990 | Fellows et al. | 315/307 |
| 4,953,068 A | 8/1990 | Henze | 363/17 |
| 4,988,920 A | 1/1991 | Hoeksma | 315/101 |
| 4,992,919 A | 2/1991 | Lee et al. | 363/17 |

(List continued on next page.)

OTHER PUBLICATIONS

"Introduction to the Principles and Features of Resonant Power Conversion", Steve Freeland, from *Recent Developments in Resonant Power Conversion*, Intertec Communications, Inc., 1988, 20–43, no month.

(List continued on next page.)

*Primary Examiner*—Jessica Han
(74) *Attorney, Agent, or Firm*—Grossman, Tucker, Perreault & Pfleger, PLLC (57) ABSTRACT

An integrated circuit inverter controller that includes at least one input pin that is configured to receive two or more input signals. The input pin may be multiplexed so that the appropriate input signal is directed to appropriate circuitry within the controller to support two or more functions of the controller. Alternatively, the input signals may be present in differing time periods so that a single pin can support two or more functions. Multifunctional or multitasked pins reduce the overall pin count of the inverter controller.

7 Claims, 6 Drawing Sheets

U.S. PATENT DOCUMENTS

| | | |
|---|---|---|
| 5,017,800 A | 5/1991 | Divan .......................... 307/66 |
| 5,027,263 A | 6/1991 | Harada et al. ................ 363/16 |
| 5,027,264 A | 6/1991 | DeDoncker et al. .......... 363/16 |
| 5,105,127 A | 4/1992 | Lavaud et al. ............... 315/291 |
| 5,113,334 A | 5/1992 | Tuson et al. ................... 363/25 |
| 5,132,888 A | 7/1992 | Lo et al. ........................ 363/17 |
| 5,132,889 A | 7/1992 | Hitchcock et al. ............ 363/17 |
| 5,157,592 A | 10/1992 | Walters ........................ 363/17 |
| 5,166,579 A | 11/1992 | Kawabata et al. ........... 315/209 |
| 5,198,969 A | 3/1993 | Redl et al. ..................... 363/17 |
| 5,208,740 A | 5/1993 | Ehsani ........................ 363/124 |
| 5,231,563 A | 7/1993 | Jitaru ........................... 363/98 |
| 5,235,501 A | 8/1993 | Stuart et al. ................... 363/17 |
| 5,268,830 A | 12/1993 | Loftus, Jr. .................... 363/17 |
| 5,270,620 A | 12/1993 | Basch et al. ................ 315/291 |
| 5,285,372 A | 2/1994 | Huynh et al. ............... 363/132 |
| 5,291,382 A | 3/1994 | Cohen ........................ 363/16 |
| 5,305,191 A | 4/1994 | Loftus, Jr. .................... 363/17 |
| 5,311,104 A | 5/1994 | Antle ......................... 315/307 |
| 5,363,020 A | 11/1994 | Chen et al. ............. 315/209 R |
| 5,384,516 A | 1/1995 | Kawabata et al. .......... 315/160 |
| 5,402,043 A | 3/1995 | Nilssen ........................ 315/307 |
| 5,402,329 A | 3/1995 | Wittenbreder, Jr. .......... 363/16 |
| 5,412,557 A | 5/1995 | Lauw ........................... 363/37 |
| 5,418,703 A | 5/1995 | Hitchcock et al. ............ 363/17 |
| 5,420,779 A | 5/1995 | Payne .......................... 363/56 |
| 5,422,546 A | 6/1995 | Nilssen ........................ 315/219 |
| 5,430,632 A | 7/1995 | Meszlenyi .................... 363/17 |
| 5,430,641 A | 7/1995 | Kates ......................... 363/133 |
| 5,438,497 A | 8/1995 | Jain ............................. 363/17 |
| 5,438,498 A | 8/1995 | Ingemi ......................... 363/17 |
| 5,442,540 A | 8/1995 | Hua et al. ..................... 363/98 |
| 5,448,155 A | 9/1995 | Jutras .......................... 323/285 |
| 5,448,467 A | 9/1995 | Ferreira ........................ 363/17 |
| 5,477,131 A | 12/1995 | Gegner ....................... 323/222 |
| 5,481,160 A | 1/1996 | Nilssen ................... 315/209 R |
| 5,481,449 A | 1/1996 | Kheraluwala et al. ........ 363/17 |
| 5,510,974 A | 4/1996 | Gu et al. ..................... 363/134 |
| 5,514,921 A | 5/1996 | Steigerwald ................ 307/125 |
| 5,546,300 A | 8/1996 | Lee et al. ................... 363/132 |
| 5,550,436 A | 8/1996 | Houk .......................... 315/209 |
| 5,559,688 A | 9/1996 | Pringle ......................... 363/89 |
| 5,583,402 A | 12/1996 | Moisin et al. .............. 315/307 |
| 5,604,411 A | 2/1997 | Venkitasubrahmanian et al. ........................... 315/307 |
| 5,615,093 A * | 3/1997 | Nalbant ....................... 363/25 |
| 5,619,402 A | 4/1997 | Liu .............................. 363/20 |
| 5,638,260 A | 6/1997 | Bees ........................... 363/17 |
| 5,642,065 A | 6/1997 | Choi et al. ................... 327/110 |
| 5,646,836 A | 7/1997 | Sadarnac et al. ............. 363/98 |
| 5,669,238 A | 9/1997 | Devers ........................ 62/657 |
| 5,677,602 A | 10/1997 | Paul et al. .................... 315/224 |
| 5,684,683 A | 11/1997 | Divan et al. .................... 33/65 |
| 5,694,007 A | 12/1997 | Chen .......................... 315/247 |
| 5,712,533 A | 1/1998 | Corti ....................... 315/169.3 |
| 5,715,155 A | 2/1998 | Shahani et al. ............. 363/132 |
| 5,719,474 A | 2/1998 | Vitello ........................ 315/307 |
| 5,731,652 A | 3/1998 | Shimada .................... 310/316 |
| 5,736,842 A | 4/1998 | Jovanovic .................... 323/222 |
| 5,742,495 A | 4/1998 | Barone ......................... 363/65 |
| 5,742,496 A | 4/1998 | Tsutsumi ..................... 363/95 |
| 5,744,915 A | 4/1998 | Nilssen ................... 315/209 R |
| 5,748,457 A | 5/1998 | Poon et al. ................... 363/16 |
| 5,754,012 A | 5/1998 | LoCascio et al. ........... 315/307 |
| 5,764,494 A | 6/1998 | Schutten et al. ............. 363/17 |
| 5,774,346 A | 6/1998 | Poon et al. ................... 363/17 |
| 5,781,418 A | 7/1998 | Chang et al. ................. 363/16 |
| 5,781,419 A | 7/1998 | Kutkut et al. ................. 363/17 |
| 5,784,266 A | 7/1998 | Chen ............................ 363/16 |
| 5,796,598 A | 8/1998 | Nowak et al. ................ 363/37 |
| 5,818,172 A | 10/1998 | Lee ............................. 315/86 |
| 5,834,889 A | 11/1998 | Ge .............................. 313/493 |
| 5,844,540 A | 12/1998 | Terasaki ..................... 345/102 |
| 5,854,617 A | 12/1998 | Lee et al. ................... 345/102 |
| 5,856,916 A | 1/1999 | Bonnet ........................ 363/20 |
| 5,875,103 A | 2/1999 | Bhagwat et al. .............. 363/17 |
| 5,880,940 A | 3/1999 | Poon ............................ 363/20 |
| 5,886,477 A | 3/1999 | Honbo et al. ......... 315/209 PZ |
| 5,886,884 A | 3/1999 | Baek et al. .................... 363/48 |
| 5,894,412 A | 4/1999 | Faulk ........................... 363/56 |
| 5,910,709 A | 6/1999 | Stevanovic et al. ......... 315/225 |
| 5,917,722 A | 6/1999 | Singh ......................... 363/132 |
| 5,923,129 A | 7/1999 | Henry ......................... 315/307 |
| 5,930,121 A | 7/1999 | Henry .......................... 363/16 |
| 5,932,976 A | 8/1999 | Maheshwari et al. ....... 315/291 |
| 5,939,830 A | 8/1999 | Praiswater ............. 315/DIG. 4 |
| 5,946,200 A | 8/1999 | Kim et al. .................... 363/17 |
| 6,002,210 A | 12/1999 | Nilssen ........................ 315/219 |
| 6,011,360 A | 1/2000 | Gradzki et al. ............. 315/244 |
| 6,016,052 A | 1/2000 | Vaughn ........................ 323/355 |
| 6,114,814 A | 9/2000 | Shannon et al. ............. 315/219 |
| 6,198,236 B1 * | 3/2001 | O'Neill ....................... 315/307 |
| 6,316,881 B1 | 11/2001 | Shannon et al. ............. 315/219 |
| 6,396,722 B2 | 5/2002 | Lin .............................. 363/98 |
| 6,640,271 B2 * | 10/2003 | Ehrenhardt et al. ......... 710/100 |

OTHER PUBLICATIONS

"Zero–Voltage Switching Technique in DC/DC Converters", Kwang–Hwa Liu and Fred C. Lee, from *Recent Developments in Resonant Power Convertion*, Intertec Communications, Inc., 1988, pp. 211–223, no month.

"A New and Improved Control Technique Greatly Simplifies the Design of ZVS Resonant Inverters and DC/DC Power Supplies", Mehmet K. Nalbant, 1995 IEEE, pp. 694–701, no month.

*Switching Power Supply Design*, Abraham I. Pressman, McGraw–Hill, 1991, pp. 93–104; 471–492, no month.

"Phase Shifted, Zero Voltage Transition Design Considerations and the UC3875 PWM Controller", by Bill Andreycak, Unitrode, Application Note, May 1997, pp. 1–14.

"Fixed–Frequency, Resonant–Switched Pulse Width Modulation with Phase–Shifted Control", by Bob Mammano and Jeff Putsch, from *Power Supply Design Seminar*, Unitrode, 1991, pp. 5–1 to 5–7, no month.

"Zero Voltage Switching Resonant Power Conversion", by Bill Andreycak, from *Power Supply Design Seminar*, Unitrode, 1991, pp. A2–1 to A2–24; and A2–1A to A2–A3, no month.

"Resonant Mode Converter Topologies", Bob Mammano, from *Power Supply Design Seminar*, Unitrode, 1991, pp. P3–1 to P3–12, no month.

"The New UC3879 Phase–Shifted PWM Controller Simplifies the Design of Zero Voltage Transition Full–Bridge Converters", by Laszo Balogh, Unitrode, Application Note, 1995, pp. 1–8, no month.

"A Comparative Study of a Class of Full Bridge Zero–Voltage–Switched PWM Converters", by W. Chen et al., 1995 IEEE, pp. 893–899, no month.

"Optimum ZVS Full–Bridge DC/DC Converter with PWM Phase–Shift Control: Analysis, Design Considerations, and Experimental Results", by Richard Red I et al., 1994 IEEE, pp. 159–165, no month.

"A Frequency/PWM Controlled Converter with Two Independently Regulated Outputs", by R.A. Fisher et al., HFPC, May 1989, pp. 459–471.

"Feasible Characteristic Evaluations of Resonant Tank PWM Inverter–Linked DC–DC High–Power Converters for Medical–Use High–Voltage Application", by H. Takano et al., 1995 IEEE, pp. 913–919, no month.

"High Density Power–Hybrid Design of a Half–Bridge Multi–Resonant Converter", by Richard Farrington, et al., HFPC–Virginia Polytechnic Institute, May 1990, pp. 26–33.

"Small–Signal Analysis of the Zero–Voltage Switched Full–Bridge PWM Converter", by V. Vlatkovic et al., HFPC–virginia Polytechnic Institute, May 1990, pp. 262–272.

Melvin C. Cosby, Jr. & R. M. Nelms, "A Resonant Inverter for Electronic Ballast Applications," IEEE Transactions on Industrial Electronics, vol. 41, No. 4, pp. 418–425 (Aug. 1994).

Steigerwald, "A Comparison of Half–Bridge Resonant Converter Topologies," IEEE Transactions on Power Electronics, vol. 3, No. 2, pp. 174–182 (Apr. 1998).

M.A. Cayless and A.M. Marsden, "Lamps and Lighting", Third Edition, Thorn EMI Lighting Ltd 1983, pp. 322–323, no month.

"BiCMOS Cold Cathode Fluorescent Lamp Driver Controller", Unitrode Products, Texas Instruments, Oct. 1998, Revised Nov. 2000.

* cited by examiner

INVERTER CONTROLLER

FIELD OF THE INVENTION

The present invention relates to an inverter controller, and more particularly, to an inverter controller that utilizes pin multiplexing and/or pin multitasking techniques to reduce the overall pin count and reduce the number of components, without reducing the functionality and/or performance of the controller. Particular utility for the present invention is for a two-switch DC/AC inverter topology for driving a CCFL, however, other inverter topologies and/or DC/DC converter topologies, and/or other loads are equally contemplated herein.

SUMMARY OF THE INVENTION

The present invention provides an integrated circuit that includes an inverter controller being adapted to generate a plurality of signals to drive an inverter circuit. The controller also includes one or more input pins configured to receive two or more input signals. Each signal supports an associated function of the controller.

In one exemplary embodiment, the input pin is configured to receive a first signal representing a dim voltage, where the first signal has a first voltage range. The pin is also configured to receive a second signal representing a voltage feedback signal, where the second signal has a second voltage range.

In another exemplary embodiment, the input pin is configured to receive a first signal representing a current feedback signal, where the first signal is present in a first time period. The pin is also configured to receive a second signal representing a soft start signal, where the second signal is present in a second time period.

The present invention also provides an inverter controller IC that includes a multiplexer circuit to direct one input signal to a first circuit to support a first function of the controller, and to direct another of the input signals to a second circuit to support a second said function of the controller.

The present invention further provides an inverter controller IC that includes an input pin configured to receive two or more input signals, each signal supports an associated function of the controller. One of the input signals is present in a first time period and another of the input signals is present in a second time period.

Thus, according to the present invention pin count may be significantly reduced. Also, by choosing which pins may be multifunctional and/or multiplexed, the present invention decreases tooling and PCB layout requirements.

Additional benefits and advantages of the present invention will become apparent to those skilled in the art to which this invention relates from the subsequent description of the preferred embodiments and the appended claims, taken in conjunction with the accompanying drawings.

DETAILED DESCRIPTION OF EXEMPLARY EMBODIMENTS

Figure 1:
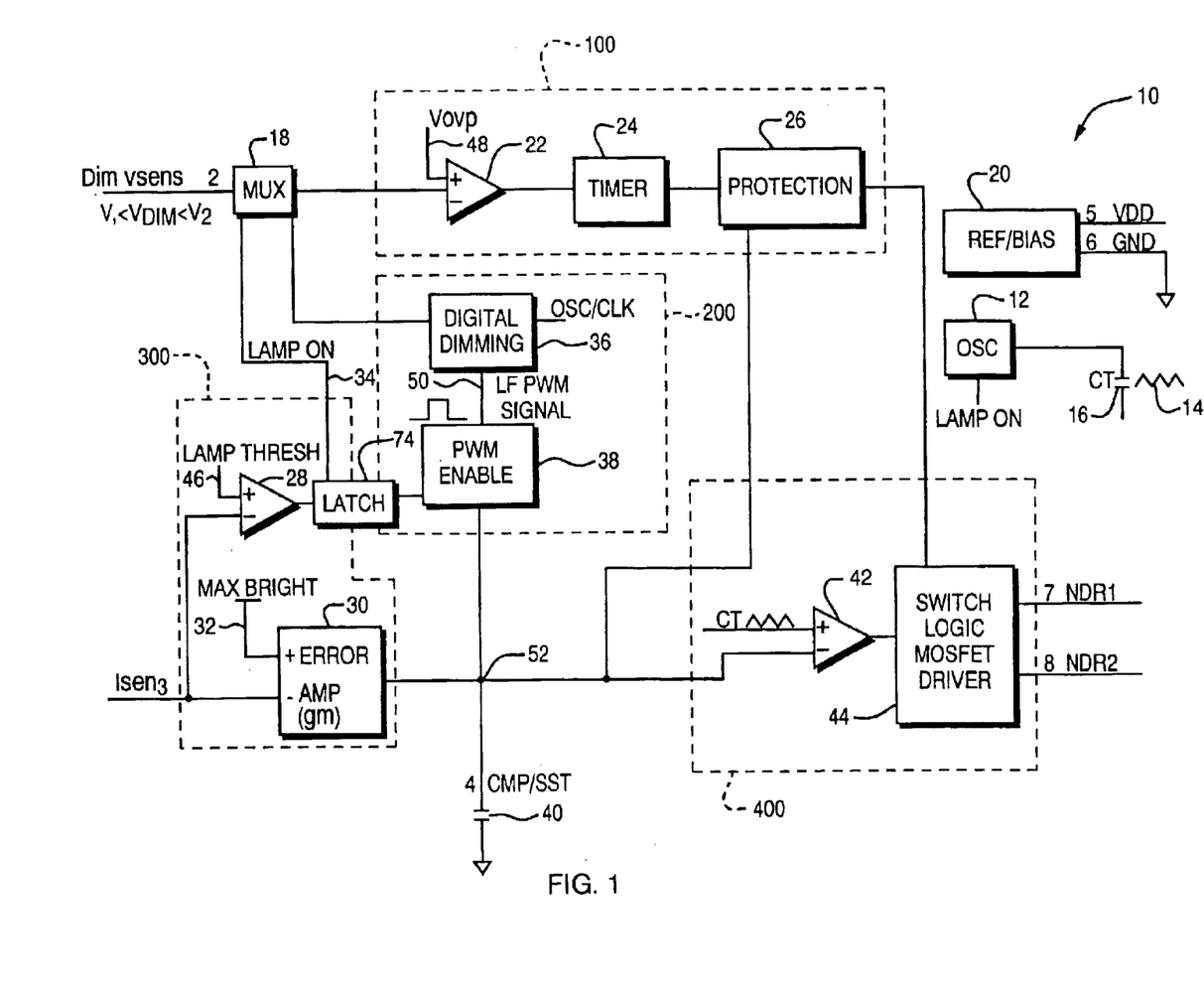
FIG. 1 is a block diagram of one exemplary inverter controller integrated circuit according to the present invention.

FIG. 1 depicts a block diagram of an exemplary inverter controller integrated circuit 10 according to the present invention. In this exemplary embodiment, the controller 10 is an 8 pin design (labeled 1–8), where pin 2 is adapted to receive two signals and multiplexed to support two functions, and pin 4 is adapted to receive two signals to support two functions, depending on the state certain components of the controller. In this example, pin 2 supports both load voltage sensing and dim signal sensing. Pin 4 supports both current comparing during normal operating conditions and soft start (SST) operation during initial turn on and/or lamp out conditions.

The controller 10 includes an overvoltage protection circuit 100, a dimming circuit 200, a current feedback control circuit 300 and an output circuit 400. The controller 10 also includes a MUX 18 to control switching of the function of PIN 2 between load voltage sensing and dimming signal input control, based on the state of the load. The controller also includes an oscillator circuit 12 that generates a sawtooth signal 14 by charging/discharging a fixed capacitor CT 16, and a reference signal/bias signal generator 20 that generates one or more of the reference and/or bias signals utilized by the controller 10. The controller operates to generate two switch driving signals NDR1 and NDR2. The drive control signals may be used to drive the two switches of a derived Royer circuit, a push pull circuit, a half bridge circuit or other two-switch inverter circuit known in the art.

Stated another way, the present invention provides an inverter controller that includes a one or more multiplexed and/or multifunctional pins, where the controller is adapted to generate one or more control signals based on the signal state of the multiplexed and/or multifunctional pins. The following description of the overvoltage protection circuit 100, the dimming circuit 200, the current control circuit 300 and the output circuit 400 will be readily understood by those skilled in the inverter arts. Each of the components of the controller 10 is described in greater detail below.

Output circuit 400 includes a comparator 42 that compares a signal 52 from the output of the error amplifier 30 with a sawtooth signal generated by the oscillator circuit 12. The error signal 52 is generated by the current control circuit 300 and/or the CMP capacitor 40 (at PIN 4), as also may be modified by the dimming circuit 200. The error signal has a value to be within the range of the minimum and maximum value of the sawtooth signal 14 for normal operation. For example, for CCFL loads, the sawtooth signal may have a range between 0V and 3.0V. As is understood in the art, the intersection between the sawtooth signal 14 and the error signal 52 is used by the switch driver logic 44 to set the pulse width of each of the switch driver signals NDR1 and NDR2. Generally, the higher the error signal value, the wider the pulse width and thus, more power is delivered to the load (although the circuitry could be modified where the reverse is true).

As set forth above, the value of the error signal 52 is determined by current feedback information generated by the current control circuit 300, and modified by the dimming circuit 200. As a general matter, The CMP capacitor 40 is charged during the initial power on of the controller 10. Error amplifier 30 operates as a current source (e.g., transconductance amplifier) to adjust the charge on the CMP capacitor 40. Amplifier 30 compares the load current Isens to a user-definable reference signal 32 indicative of maximum load current at maximum power or maximum brightness 32. If the value of the load current is less than signal 32, amplifier 30 will source current to charge the capacitor 40 in an attempt to increase the DC value of the error signal 52, thereby increasing the pulse width of the output driver signals NDR1 and NDR2. If the value of the load current is greater than the reference signal 32, amplifier 30 will sink charge from the CMP capacitor 40 to decrease the DC value of the error signal 52, thereby decreasing the pulse width of the output driver signals NDR1 and NDR2. In other words, amplifier 30 represents a closed loop feedback current control that sources or sinks current to attempt to maintain the load current Isens approximately equal to the reference signal 32.

Dimming circuitry 200 is enabled by the MUX circuit 18 (a process that is described in greater detail below), the relative dim value is set by VDIM (PIN 2). In the exemplary embodiment, VDIM is a DC signal having a value between V1 and V2. VDIM may be generated by a software programmable dimming value or a switch (e.g., rotary switch) operated by a user. In this example, the greater the value of Vdim, the more power is delivered to the load although the circuitry could be modified where the reverse is true. Dimming circuitry 200 is a burst mode dimming circuit that generates a burst mode signal (low frequency PWM signal 50) that its duty cycle is proportional to Vdim. The frequency of the burst mode signal 50 is selected to be far less than the frequency of the driving signals NDR1 and NDR2. For example, for CCFL applications the typical operating range of the driving signals is 35–80 kHz, and the burst mode signal may have a frequency of approximately 200 Hz.

In the exemplary embodiment, dimming circuit 200 comprises a digital dimming circuit that receives Vdim and converts Vdim to a digital signal. The digital signal is weighted to a predetermined bit depth (e.g., 8 bit) to render a predetermined number of dimming values (e.g., 256 dim levels). The digital dimming circuit 36 generates a burst mode signal 50 that has a duty cycle proprtial to the value of Vdim. In this example, the duty cycle of the burst mode signal 50 ranges from 0% (Vdim=V1) to 100% (Vdim=V2).

If the dimming circuit 200 is enabled by the MUX 18, the PWM enable block 38 operates to sink charge from the CMP capacitor 40. The enable block 38 may comprise a simple switch tied to ground whose conduction state is controlled by the burst mode signal 50. As stated above, error amplifier 30 generates an output to maintain a DC signal 52 having a maximum value represented by signal 32. The burst mode signal 50 operates as follows. When the burst mode signal is asserted (high or low), the enable circuit 38 sinks the charge from the capacitor 40. The resulting DC signal 52 is a minimum value (e.g., 0 Volts). As a result, the signal generated by comparator 42 represents the intersection between the lowest value of the CT signal 14 and the DC signal 52, and accordingly the switch driver logic 44 turns the driving signals NDR1 and NDR2 off while the burst mode signal is asserted. When the burst mode signal is deasserted, the PWM enable block essentially becomes an open circuit and the error amplifier 30 recharges capacitor 40 to the original value. The resulting error signal resumes to the value corresponding to the maximum brightness output as described above, and accordingly the switch logic driver generates driving signals NDR1 and NDR2 having a duty cycle corresponding to the maximum brightness output. Thus, burst mode operation, in this exemplary embodiment, swings the output from fully on to fully off at a frequency determined by the burst mode signal 50.

PIN 2 is adapted to receive two signals representing both load voltage sensing (Vsens) and DIM signal input. The DIM signal (Vdim) is used to support power control of the load. Load voltage control is used, for example, to detect an overvoltage condition at the load. In this example, a multiplexer MUX 18 is utilized to direct the input on PIN 2 (either Vsens or Vdim) into the overvoltage protection circuit 100 or the dimming circuit 200, based on a predetermined condition. In this example, the predetermined condition is a lamp on signal 34 which indicates that a lamp load is present and working properly, where signal 34 is an input to the MUX 18. In this exemplary embodiment, the DIM signal is fixed to a predetermined range, i.e., V1<Vdim<V2. Vsens is configured to be outside this range, i.e., Vsens>V2, or Vsens<V1.

When the controller is initially powered on to drive a load, the controller will receive both load voltage and load current feedback to determine if the load is operating properly. Current feedback is represented by Isens at PIN 3, and voltage feedback is represented by Vsens at PIN 2. Assuming a lamp load (e.g., CCFL), those skilled in the art will recognize that a broken or missing lamp can create a dangerously high voltage situation at the secondary side of a transformer (not shown in FIG. 1). Thus, the present invention initially determines the status of the lamp load by checking if a minimum current is being delivered to the load.

To that end, comparator 28 compares the load current Isens with a lamp threshold signal 46. The lamp threshold signal 46 is a signal indicative of the minimum current that should be present at the load if the load is working properly. If Isens is greater than or equal to signal 46, comparator 28 generates a lamp on signal 34 indicative that the load is properly working. The lamp on signal 34 is a control signal generated by the comparator 28 that controls the state of the MUX 18. In this case, the lamp on signal sets the output state of the MUX to couple the dimming circuitry 200 to PIN 2. A latch circuit 74 is provided to latch the output of the lamp on signal once Isens exceeds the threshold signal 46. The lamp on signal will remain in this state during normal operation, so that burst mode dimming (described below) does not change the state of the lamp on signal. The Vdim input on PIN2 is then used to set the desired dim brightness value (as will be described below).

If, however, during the time when the controller is initially powered to drive the load (and before the latch circuit 74 is set), the current sense value Isens stays below the lamp threshold signal 46, the output of the amplifier 28 changes the state of the lamp on signal 34. This, in turn, changes the state of the MUX to couple the overvoltage protection circuit 100 to PIN 2. As is understood in the CCFL arts, Vsens is derived from the secondary side of the transformer used to drive the lamp load. Under normal operating conditions, Vsens will not affect the range of Vdim, i.e., V1<Vdim<V2. If, however, and open or broken lamp condition exists, Vsens will rise to a value greater than V2. When PIN 2 is coupled to the overvoltage protection circuit 100, Vsens is compared to a predetermined overvoltage threshold signal Vovp (where Vovp>V2) in comparator 22. When Vsens exceeds Vovp 48, the output of comparator causes timing circuit 24 to initiates a predefined timeout period.

Since this is a broken or missing lamp condition, Isens will have a value less than the lamp threshold signal 46. Also, error amplifier 30 will generate an output signal in an attempt to source the CMP capacitor to increase the power delivered to the load. Accordingly, during the timout period, the protection circuit operates in a manner similar to the PWM enable circuit 38. During this period, to prevent the error amplifier from generating a error singal to cause the switches to drive at higher power, the OVP signal 60 stops the error amplifier 30 to charge/discharge of CMP capacitor 40 At the end of the timout, the protection circuit 26 disables the switch driver logic 44 and thus the output overvoltage is controlled.

Thus, to summarize, the present invention provides an inverter controller IC for generating power to a load that includes: 1) an overvoltage protection circuit 100 configured to receive a voltage feedback signal from the load and configured to generate a protection signal to discontinue power to the load, 2) a dimming circuit 200 configured to receive a dimming signal and configured to generate a dimming signal to control the power delivered to the load, 3) a current control circuit 300 configured to receive a current feedback signal from the load and configured to generate an error signal; and an output circuit 400 configured to receive said error signal and said dimming signal and configured to generate drive signals for driving said load. One of the IC pins (e.g., PIN 2) is configured to receive the voltage feedback signal and the dimming signal. A multiplexer 18 coupled to the pin and configured to direct the voltage feedback signal to the overvoltage protection circuit or the dimming signal to the dimming circuit, based on the value of the current feedback signal.

PIN 4 and the CMP capacitor also operates to control soft start (SST) functionality. Soft start, as is known in the art, essentially operates in the beginning of power on, to cause the output circuitry to generate a minimal pulse width and gradually increase the pulse width. At initial power on the voltage on the CMP capacitor is zero. Isens is also zero, and therefore the error amplifier attempts to source the CMP capacitor to a charge that satisfies signal 32. The time this process takes is dependent on the desired charge on CMP and the capacitance of CMP, and therefore this time period is utilized as soft start. This ensures that the amount of power to the load is increased gradually. It continues until the load current value reaches the threshold value 32. Then the error amplifier 30 takes over the control of PIN 4 which is the charge on the capacitor, as described herein. For CCFL loads, it is known that a gradual increase in lamp current helps to ensure the life of the lamp.

Thus, PIN 4 is adapted to generate the DC signal CMP 52 based on the values of the error signal generated by the current control circuit 300 and/or the dimming signal generated by the dimming circuit 200. PIN 4 is multifunctional since it is also adapted to generate a soft start signal 52 based on the value of the error signal generated by the current control circuit 300.

Figure 5:
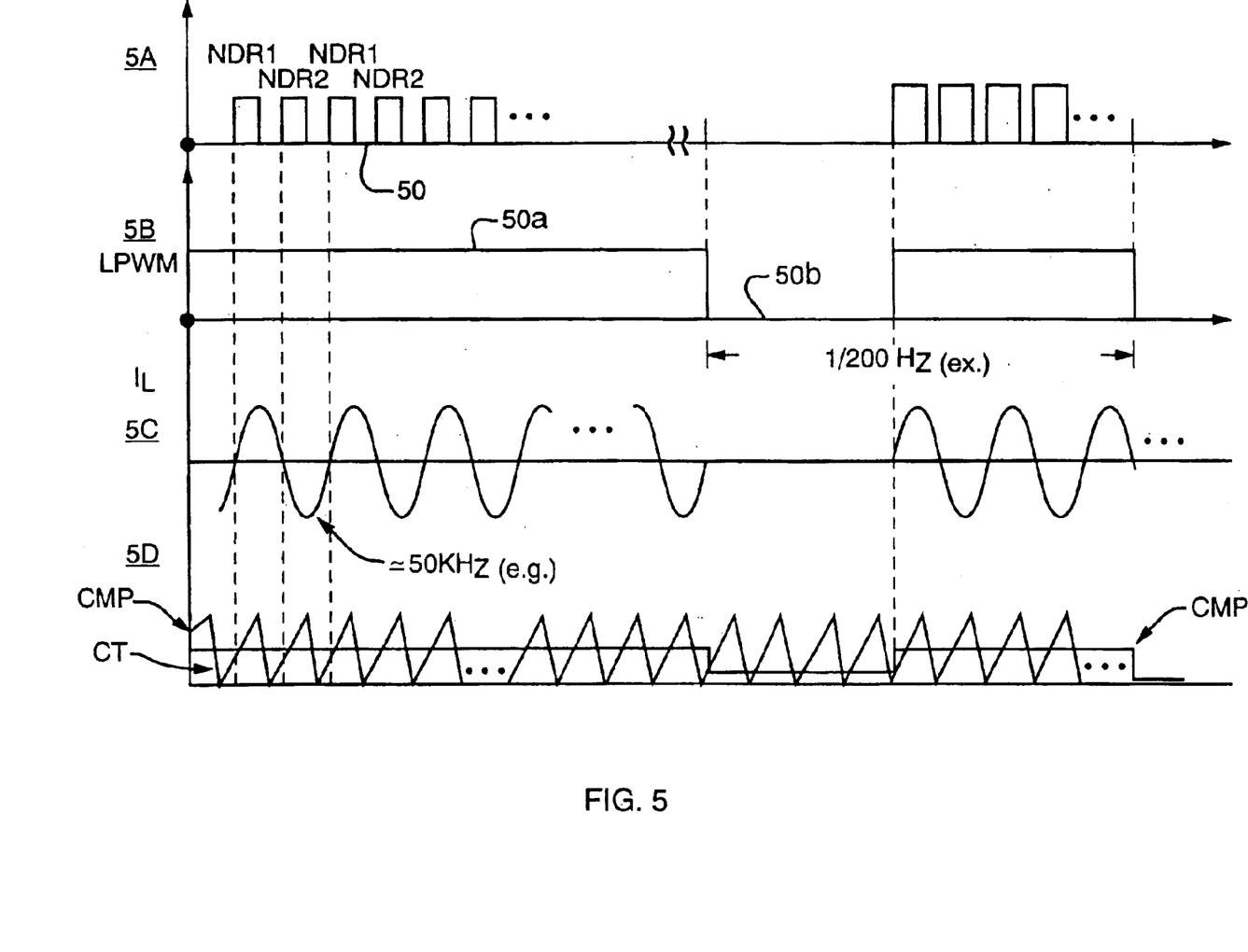
FIG. 5 depicts representative signal graphs for certain signals generated by the controller of FIG. 1.

FIG. 5 depicts representative signal graphs for certain signals generated by the controller 10 of the present invention. FIG. 5A shows the drive signals NDR1 and NDR2. The pulse width of the drive signals is determined by the intersection of the DC error signal CMP 52 and the sawtooth signal CT, as depicted in FIG. 5D. FIG. 5B depicts the burst mode signal (LPWM) 50, and FIG. 5C depicts the load current $I_L$. When the burst mode signal is deasserted (high) 50A, the drive signals and lamp current are present. When the burst mode signal is asserted (low) 50B, the drive signals stop and the lamp current is approximately zero. Note that when the burst mode signal is asserted the CMP signal drops to a minimum value (approximately zero) as described above.

Figure 2:
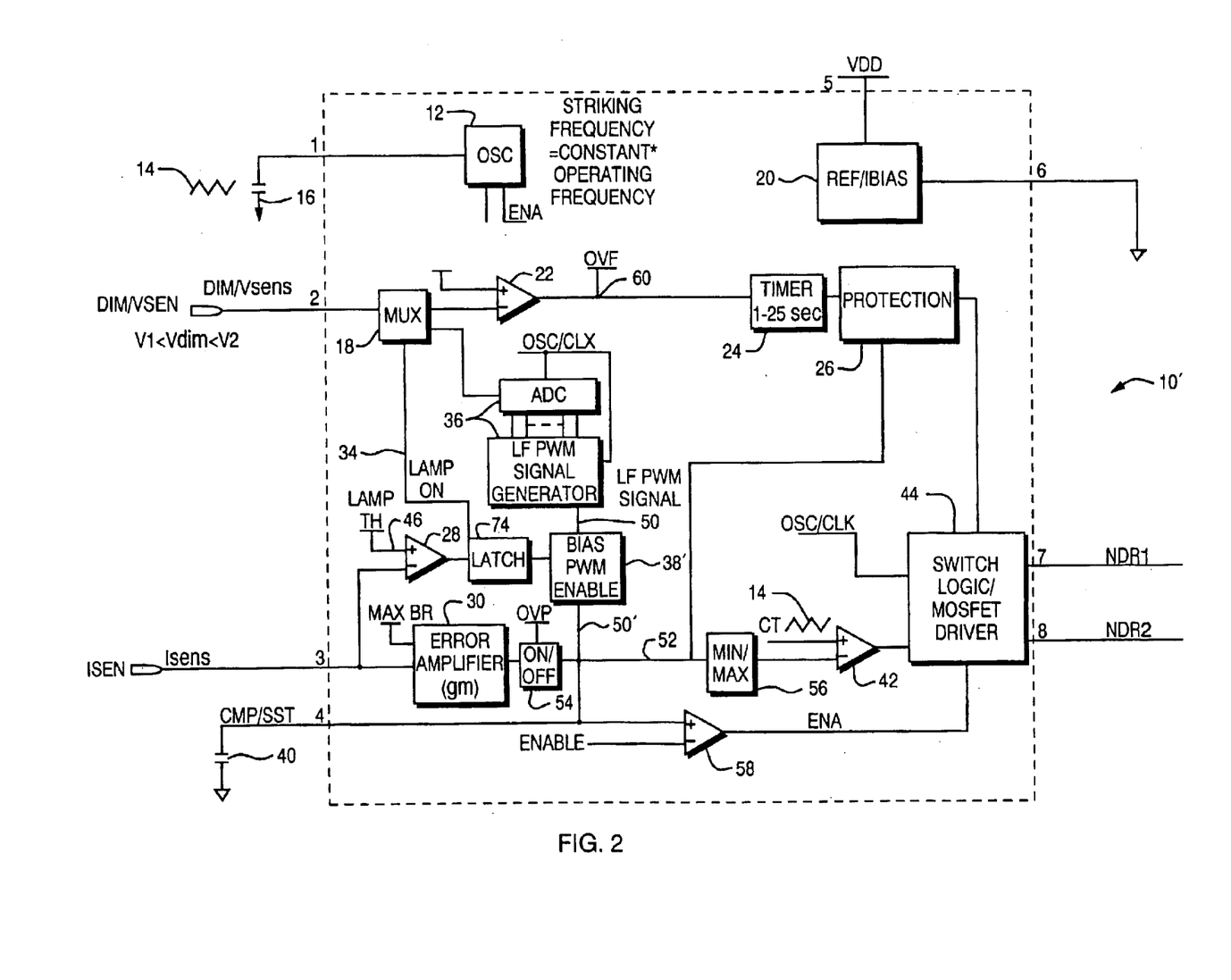
FIG. 2 is a block diagram of another exemplary inverter controller integrated circuit according to the present invention.

FIG. 2 depicts another exemplary inverter controller 10' according to the present invention. The inverter controller 10' of this exemplary embodiment operates in a similar manner as described above with reference to FIG. 1, but includes additional circuitry which may be desirable for a given operating environment. For example, at the output of error amplifier 30 is an on/off circuit triggered by the OVP signal. If the overvoltage protection circuit is activated, the OVP signal shuts the output of the error amplifier 30 off, regardless of the value of Isens. Thus, when the OVP signal is asserted, block 30 neither sources nor sinks capacitor 40. Of course, the protection circuitry may also be adapted to charge or discharge the capacitor 40 to some minimum level so that the output signals deliver a predetermined minimum pulse width to the load during the time out period.

The controller 10' also includes a min/max circuit 56 which, during times when the burst mode signal is enabled, generates a minimum DC value (instead of a zero DC value 52, as described above during these periods). Thus, the intersection between the sawtooth signal and the minimum DC signal generated by the min/max circuit 56 generates an output to cause the output signals to have some predetermined minimum pulse width. This prevents, for example, wide voltage swings and/or maintain continuous function of the drive signals between burst mode signal asserted and burst mode signal deasserted.

An enable comparator 58 is provided to generate an enable control signal to the switch logic 44. The comparator generates an enable signal (thereby enabling the switch logic) if the value on the capacitor 40 is greater than the enable threshold value or else the switch logic is disabled.

The PWM enable circuit 38' may include a floor value (i.e., bias), below which the PWM enable circuit will not sink charge from the CMP capacitor 40. Like the min/max circuit, this prevents the burst mode enabled signal from completely sinking the charge on the capacitor, so that the output signals are set at a predetermined minimum other than zero. The value of the bias may be selected in accordance with the operating range of the controller, a desired minimum power delivered to the load during burst mode assertion, and/or other factors that will be apparent to those skilled in the art.

Figure 6:
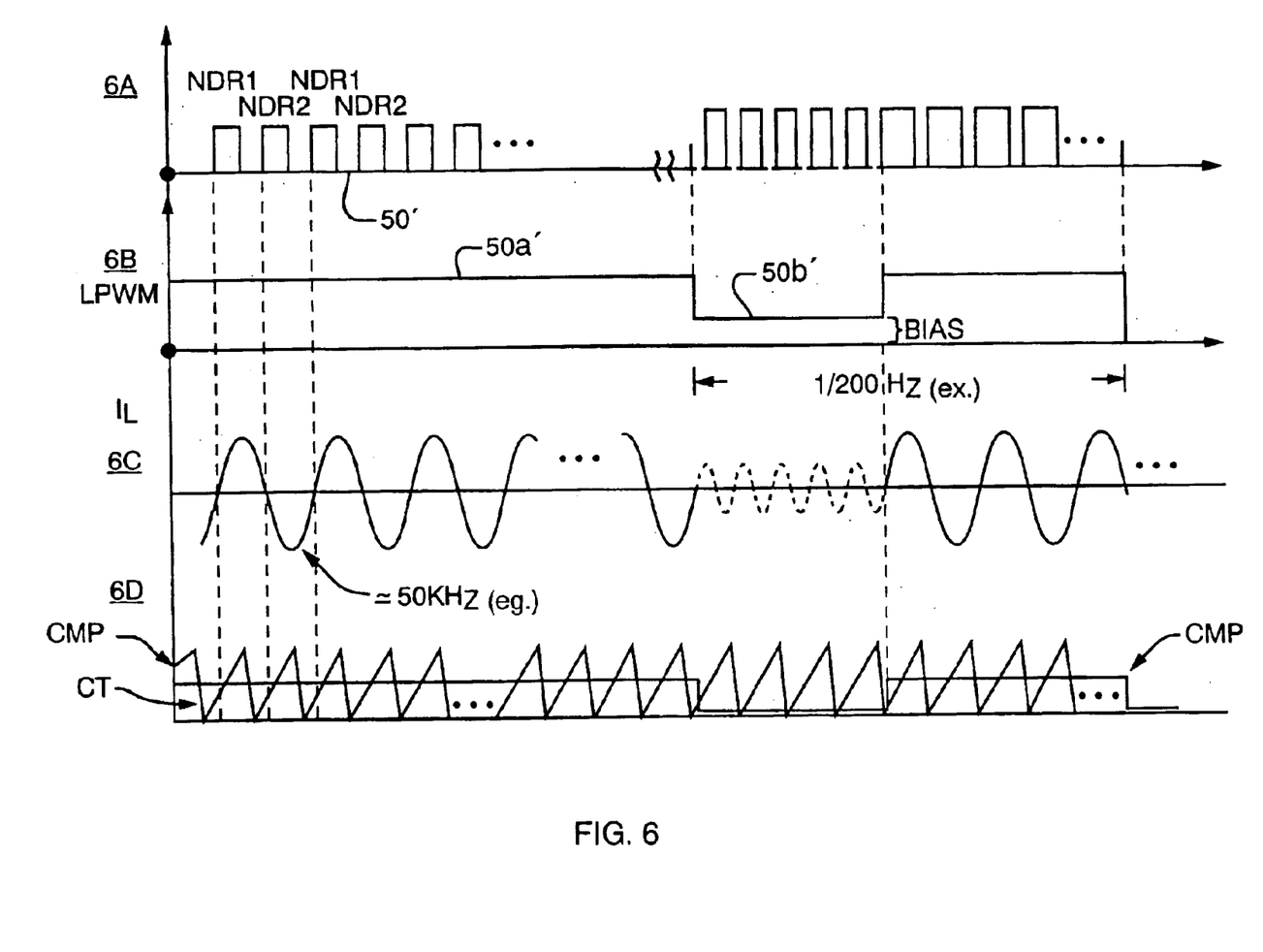
FIG. 6 depicts representative signal graphs for certain signals generated by the controller of FIG. 2.

FIG. 6 depicts representative signal graphs for certain signals generated by the controller 10' of the present invention. FIG. 6A shows the drive signals NDR1 and NDR2. The pulse width of the drive signals is determined by the intersection of the DC error signal CMP 52 and the sawtooth signal CT, as depicted in FIG. 6D. FIG. 6B depicts the burst mode signal (LPWM) 50', and FIG. 6C depicts the load current $I_L$. When the burst mode signal is deasserted (high) 50A', the drive signals and lamp current are present. When the burst mode signal is asserted (low) 50B', the drive signals are reduced to a predetermined minimum pulse width and the lamp current is significantly reduced. The asserted value of the burst mode signal 50B' is biased in a manner described above. Note that when the burst mode signal is asserted the CMP signal drops to a minimum value (greater than zero), as described above.

Thus, the exemplary inverter controller ICs 10 and 10' of FIGS. 1 and 2 include a pin (e.g., PIN2) that is multiplexed to receive a first input signal (e.g., Vdim or Vsens) with a first predefined range, and a second signal with a second predefined range. The inverter controller ICs 10 and 10' are also adapted to include a pin (e.g., PIN 4) that is multifunctional to operate is a first time period (e.g., normal operating conditions) and a second time period (e.g., initial power using soft start loading).

Figure 3:
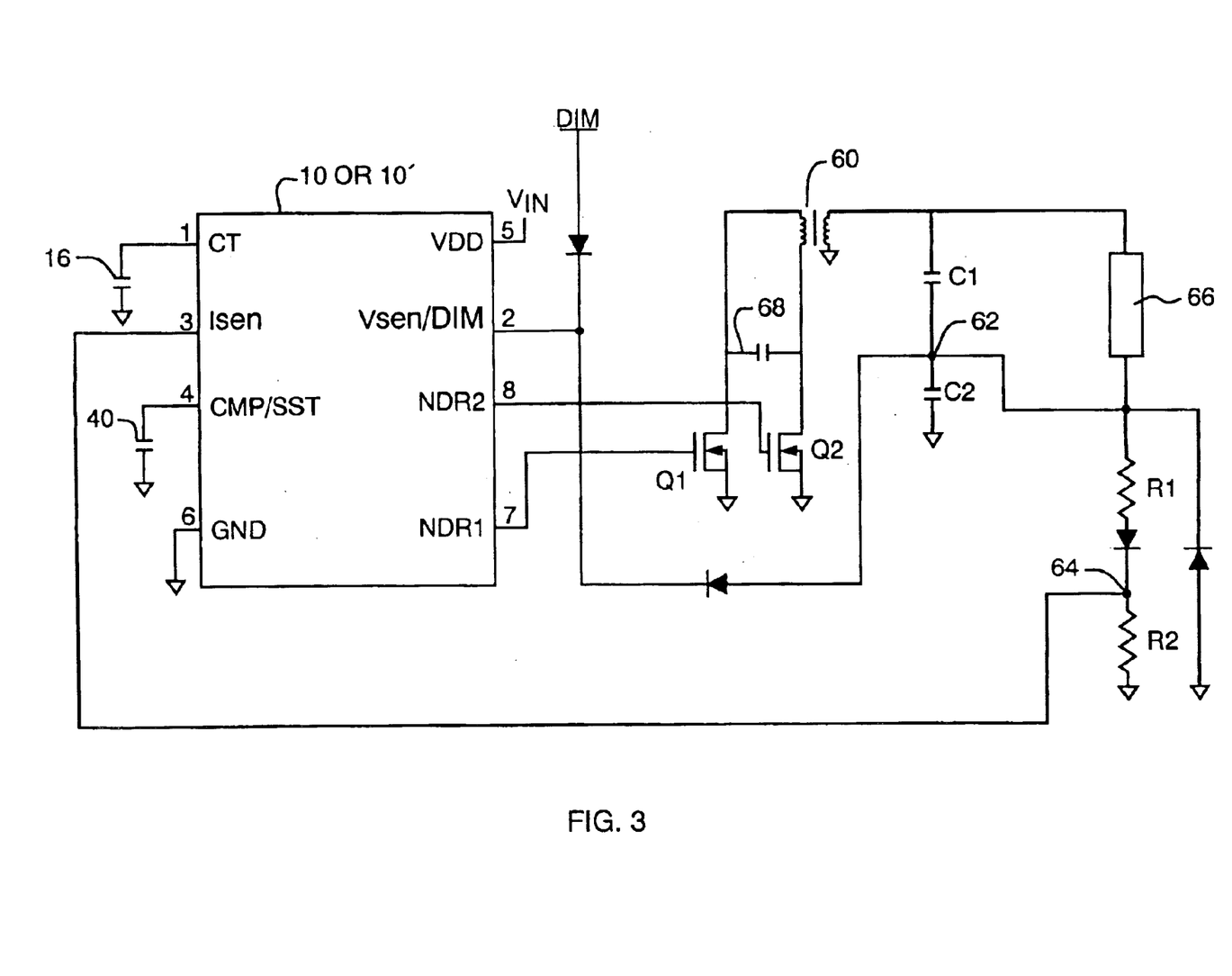
FIG. 3 depicts an exemplary application circuit topology for the inverter controller IC of FIG. 1 or 2.
Figure 4:
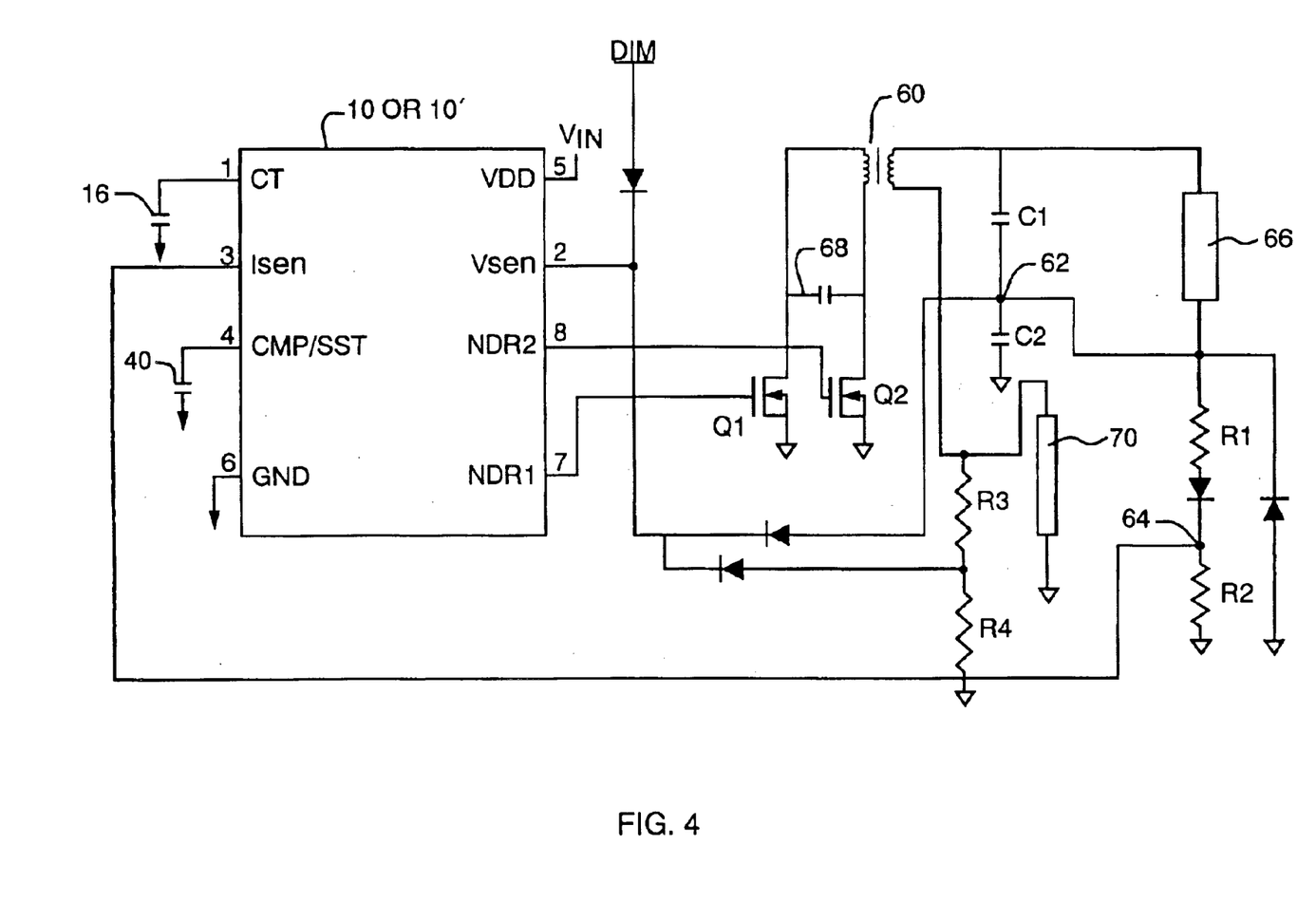
FIG. 4 depicts another exemplary application circuit topology for the inverter controller IC of FIG. 1 or 2.

FIG. 3 depicts an exemplary application topology for the inverter controller IC 10 or 10'. The controller IC 10 or 10' depicted in FIG. 3 is used to drive a derived Royer circuit comprised of transistors Q1 and Q2, to power a CCFL load 66. Q1 and Q2 drive the primary side of the transformer 60, through a resonant tank circuit formed by the capacitor 68 and the primary side inductance of the transformer 60. The operation of this type of circuit is well known by those skilled in the art. Vsen is derived from a voltage divider between capacitors C1 and C2 (node 62) so that the value of Vsen is nominal compared to the voltage at the secondary side of the transformer. Vsen is typically in the range of 1 to 5 Volts. Isen is derived from the CCFL load through the divider circuit of R1 and R2 (node 64). Isen will typically range between 0 Volts (no lamp) to 1.25 Volts (full lamp brightness). Of course, these values are only exemplary, and may be modified to meet design criteria without departing from the present invention. FIG. 4 represents another exemplary application topology for the inverter controller 10 or 10'. The controller in this embodiment is used to drive two (or more) CCFL loads 66 and 70. In this case, since lamps 66 and 70 are in series, current feedback Isens is derived from the voltage divider R1, R2.

Those skilled in the art will recognize numerous modifications that may be made to the present invention. For example, the controller ICs 10 and 10' of FIGS. 1 and 2 multiplex the values of Vsen and DIM on PIN 2, and combine the functionality of the charge capacitor CMP 40 and soft start functionality. However, these are only examples of pin multiplexing/multitasking that may be accomplished by the present invention. Other pins associated with the exemplary IC may be multiplexed and/or multitasked. Additionally, other IC designs that require more or fewer pins than the 8 pin IC depicted in FIGS. 1 and 2 may likewise include pin multitasking and/or multiplexing as provided herein.

Still other modifications may be made. In the exemplary controller ICs of FIGS. 1 and 2, PIN 2 is multiplexed to support both load voltage sensing and dim signal input. The range of dim signals (V1<Vdim<V2), as disclosed above, and the overvoltage protection threshold Vovp are selected such that Vovp>V2. However, this relationship is not required for the present invention to operate properly. Indeed Vovp may be selected within or below the range of Vdim, since the Vdim value is used by the overvoltage protection circuit 100, independent of the dim value. Alternatively, the multiplexed and/or multifunctional pins disclosed herein may be adapted to support three or more signals, using multiplexing and or multifunctional techniques provided herein.

Still other modifications may be made. For example, the exemplary application topologies of FIGS. 3 and 4 depict the controller ICs 10 or 10' driving a derived Royer circuit formed by Q1 and Q2. However, the controller 10 or 10' may be likewise applied to a push-pull inverter, a half bridge inverter and/or other type of two switch inverter topology known in the art. Yet further, the controller IC 10 or 10' may be modified to include a second pair of drive signals (e.g., PDR1 and PDR2) to enable the controller IC 10 or 10' to drive a four switch inverter topology (e.g., full bridge inverter).

The present invention is not limited to a CCFL load. Indeed the controller 10 or 10' of the present invention may be used to drive other lamp loads, such as metal halide or sodium vapor. Still other loads may be used. For example, the controller 10 or 10' of the present invention may be adapted to operate in a frequency range to support driving an x-ray tube or other higher frequency load. The present invention is not limited to the load type, and should be construed as load independent. Additionally, for multiple lamp topologies such as depicted in FIG. 4, numerous other topologies may be used, for example as described in U.S. Pat. No. 6,104,146, and U.S. patent application Ser. Nos. 09/873,669, 09/850,692, and 10/035,973, all of which are incorporated by reference in their entirety.

A detailed discussion of the operation of certain components of FIGS. 1 and 2 has been omitted. For example, the operation of the oscillator circuit 12 and the operation of the switch logic 44 have been omitted since it is assumed that one skilled in the art will readily recognize both the operation and implementation of these features. Also, the timing of the drive signals NDR1 and NDR2 is not described at length herein, since the operation of these signals will be apparent to those skilled in the art. The preceding detailed description of the block diagrams of FIGS. 1 and 2 is largely directed to the functionality of the components. The components of FIGS. 1 and 2 may be off-the-shelf or custom components to achieve the functionality stated herein, and those skilled in the art will readily recognize that many circuit implementations may be used to accomplish the functionality stated herein, and all such alternatives are deemed within the scope of the present invention.

Still further, inverter controller circuits that include voltage and current feedback, and dimming control (as described herein) are well known to those skilled in the art. However, the prior art integrated circuit inverter controllers have failed to address the long-felt need to reduce the IC package pin count while maintaining the functionality of the inverter IC. The present invention described herein provides examples of addressing this issue by providing, for example, multiplexed and/or multifunctional IC pins. Numerous modifications to this inventive theme will be apparent to those skilled in the art, and all such modifications are deemed within the scope of the present invention, as set forth in the claims.

What is claimed is:

1. A system, comprising:
   one or more cold cathode fluorescent lamps;
   an inverter circuit generating an AC signal to power said one or more lamps; and
   an inverter controller adapted to generate a plurality of signals to drive said inverter circuit, said controller comprising at least one input pin configured to receive at least two independent input signals, each said input signal supporting an associated function of said controller during operation of said controller.

2. The system as claimed in claim 1, wherein said inverter circuit is selected from a push-pull, half bridge and full-bridge inverter topologies for converting a DC signal to said AC signal.

3. The system as claimed in claim 1, wherein said inverter circuit comprises a plurality of power switches for converting a DC signal to said AC signal.

4. The system as claimed in claim 1, wherein said inverter circuit comprises a step-up transformer receiving said AC signal and generating a stepped-up AC signal.

5. The system as claimed in claim 1, wherein said input pin configured to operate with a first signal representing a dim voltage, said first signal having a first voltage range; and a second signal representing a voltage feedback signal indicative of voltage supplied to said CCFL, said second signal having a second voltage range.

6. The system as claimed in claim 1, further comprising a multiplexer circuit to direct one of said input signals to a first circuit to support a first said function of said controller, and to direct another of said input signals to a second circuit to support a second said function of said controller.

7. The system as claimed in claim 1, wherein one of said input signals is present in a first time period and another of said input signals is present in a second time period.

* * * * *